Jan. 15, 1935. H. S. HUMPHREY 1,987,854
VALVE ASSEMBLY
Filed May 27, 1933 2 Sheets-Sheet 1

INVENTOR
Herbert S. Humphrey
BY Chappell & Earl
ATTORNEYS

Jan. 15, 1935. H. S. HUMPHREY 1,987,854
VALVE ASSEMBLY
Filed May 27, 1933 2 Sheets-Sheet 2
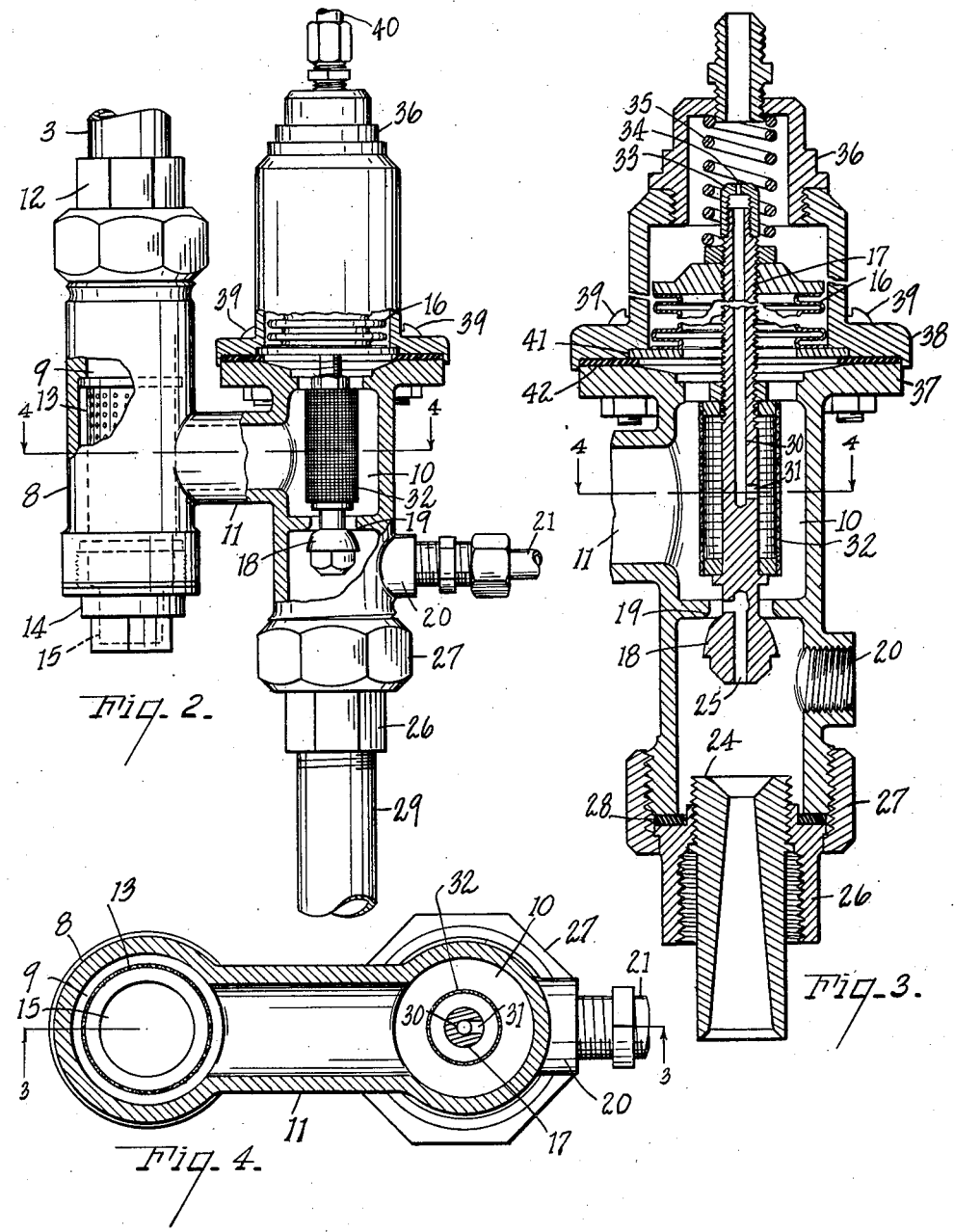
INVENTOR
Herbert S. Humphrey
BY Chappell & Earl
ATTORNEYS Patented Jan. 15, 1935

1,987,854

UNITED STATES PATENT OFFICE 1,987,854

VALVE ASSEMBLY

Herbert S. Humphrey, Kalamazoo, Mich., assignor to H. L. G. Co., Kalamazoo, Mich.

Application May 27, 1933, Serial No. 673,192

5 Claims. (Cl. 210—24)

The main objects of this invention are:

First, to provide an improved brine injector valve assembly for water softeners and the like.

Second, to provide the injector valve assembly with integral valve and screen chambers and a lateral conduit connecting said chambers.

Third, to provide the screen chamber with an improved sediment collector.

Fourth, to provide the screen chamber with an improved sediment clean-out.

Fifth, to provide improved means for assembling the Venturi tube and the valve chamber so that the Venturi tube is readily removable.

Sixth, to provide a water softener valve assembly which is very positive in operation even on low water pressures.

Seventh, to provide a valve assembly of this character having a metallic bellows.

Eighth, to provide a water softener valve assembly having these desirable features which is simple and economical in its parts and efficient and effective in operation.

Objects pertaining to details and economies of my invention will appear from the description to follow. The invention is defined and pointed out in the claims.

A structure embodying the features of my invention is illustrated in the accompanying drawings, in which:

Fig. 2 is an enlarged fragmentary view in front elevation of my valve assembly, portions being broken away and shown in vertical section.

Fig. 3 is an enlarged fragmentary vertical section on line 3—3 of Fig. 4.

Fig. 4 is a transverse horizontal section on a line corresponding to line 4—4 of Figs. 2 and 3.

Figure 1:
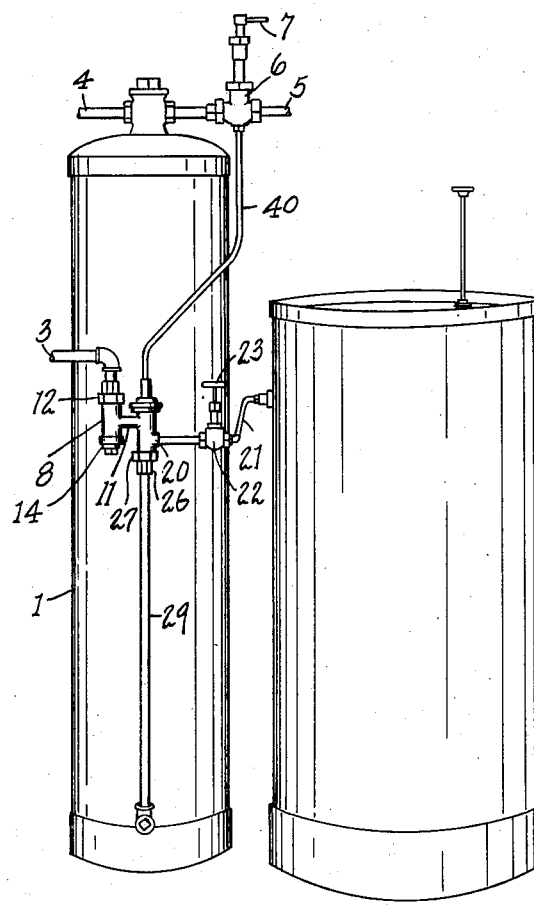
Fig. 1 is a perspective view of a water softening system having a brine injector valve assembly embodying the features of my invention.

In the embodiment of my invention illustrated, 1 is a tank containing the water softening mineral or material such as zeolite compound, and 2 is the brine tank. Water to be softened is supplied to the system through the inlet pipe 3 and the softened water is delivered by the system to the house pipe 4. Drain pipe 5 is connected to the sewer and is provided with a valve 6 having an operating handle 7.

The brine injector valve assembly 8 comprises a screen chamber 9 and a valve chamber 10 having a lateral connecting conduit 11, the chambers and conduit being an integral casting. The screen chamber is arranged in vertical position and is connected at its upper end to the inlet water pipe 3 by means of the coupling 12. A cylindrical screen 13 is arranged in vertical position within the screen chamber and is supported by the clean-out closure 14 which is threaded in the lower end of the screen chamber. The closure is provided with a sediment collecting chamber 15 opening to the lower end of the screen so that the screen may be readily removed from the screen chamber and the latter cleaned out by merely removing the clean-out closure cap.

Figure 3A:
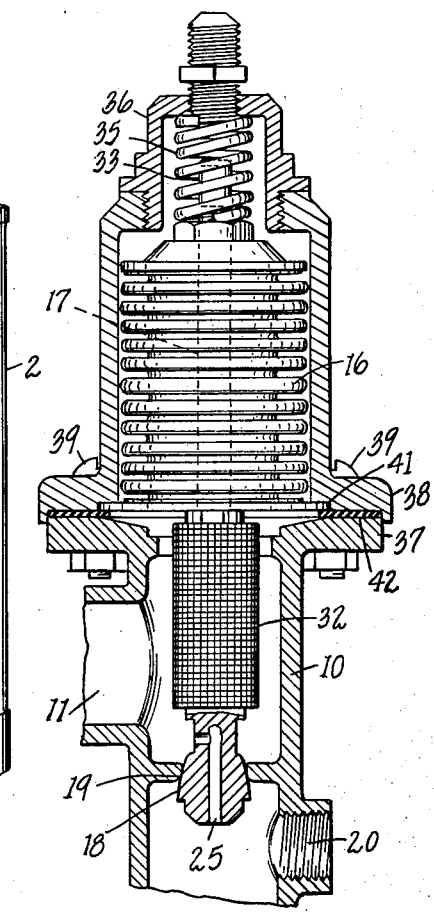
Fig. 3A is a view similar to Fig. 3 showing the valve in closed position.

The metallic bellows valve control 16 at the upper end of the valve chamber has a valve stem 17 extending therethrough, the valve stem being carried by the bellows for operating movement. The valve 18 is mounted on the lower end of the valve stem to coact with the valve seat 19. Figs. 2 and 3 show the valve in normal position and Fig. 3A illustrates the valve in closed position for injecting brine into the supply water to regenerate the water softening material in the tank 1.

The brine inlet 20 is connected to the brine tank by the pipe 21 having a valve 22 provided with an operating handle 23. The Venturi tube 24 is disposed in line with the jet outlet bore 25 of the valve stem and is held in position by means of the coupling 26 and the nut 27. A gasket 28 is disposed between the lower end of the valve chamber and the abutting shoulder of the coupling. The Venturi tube is threaded into the coupling. The upper end of the pipe 29 is threaded into the coupling 26 and is connected at its lower end to the softener tank 1.

With the parts thus arranged the Venturi tube is readily removable from the assembly.

The valve 17 is provided with a longitudinal bore 30 extending from the upper end thereof to a point below the bellows, there being a lateral inlet 31 at such point. A cylindrical screen 32 is carried by the stem below the bellows for straining the water before it enters the inlet. The inlet and the bore in the stem constitute a by-pass. On the upper end of the valve stem is threaded a cap 33 having a bleed port 34 for restricting the flow through the by-pass.

The valve is urged to its open or normal position by the compression spring 35 which is disposed within the head 36. The valve chamber and head are provided with annular flanges 37 and 38 secured in assembled relation by means of the bolts 39, the annular flange 41 at the base of the bellows and the gasket 42 being arranged between said flanges.

The upper end of the head is connected to the regenerating valve 6 by the pipe 40. The regenerating valve is arranged to control the flow through the drain pipe 5 and the flow through the pipe 40 so that when the valve 6 is opened the back pressure above the bellows is released, causing the pressure of the supply water to close the valve 18 as illustrated by Fig. 3A.

The water softening chemicals within the container 1 are regenerated by merely opening the valves 6 and 22. This results in brine being drawn from the tank 2 and passed through the tank 1, the wash being discharged by way of the drain pipe 5. After the chemicals or water softening materials in the water softener have been regenerated, the valve 22 is closed and the water allowed to run until the tank 1 contains no brackish water. The valve 6 is then closed and the system is in condition to deliver soft water. The closing of the valve 6 causes the by-pass and bleed valve to build up a back pressure above the bellows which allows the spring to open the valve. Figs. 2 and 3 illustrate the parts in normal position.

Those skilled in the art will appreciate that I have greatly simplified the valve assembly by arranging the screen chamber in a vertical position and in forming it integral with the valve chamber. Further, the screen in the screen chamber and the sediment therein may be cleaned out by merely unscrewing the closure cap at the lower end thereof. The provision of the by-pass in the valve stem not only greatly simplifies the structure, but reduces the cost of its manufacture and results in improved operation. The Venturi tube may be readily removed without disassembling the entire structure. My improved brine injector valve for water softeners is simple in its parts, economical to manufacture, and efficient in operation.

With my metallic bellows the required movement of the valve is obtained so easily that there is not only no distortion of the bellows to cause wear and breakdown, but there is not even any strain on the part. Thus, the life of the bellows is substantially perpetual, and repairs and replacement and interruption of service due to breakdown of this part are obviated.

A further advantage is that the mechanism operates successfully on low pressures.

I have illustrated and described my improvements in an embodiment which I have found very practical. I have not attempted to illustrate or describe other embodiments or adaptations as it is believed that this disclosure will enable those skilled in the art to embody or adapt my improvements as may be desired.

Having thus described my invention what I claim as new and desire to secure by Letters Patent is:

1. A brine injector valve assembly for water softeners comprising a screen chamber having a water inlet, a combined valve and injector chamber formed integrally with said screen chamber, the valve chamber being connected to the injector chamber by a port having a downwardly facing valve seat, the injector chamber having a brine inlet connection, a metallic bellows in the upper end of said valve chamber, the portion of said valve chamber above said bellows having a bleed or relief connection, a valve stem carried by and arranged through said bellows and having a passage opening at its upper end to said bleed connection and at its lower end to said valve chamber, a cylindrical screen carried by said stem and surrounding the entrance to said passage, a valve on said stem controlling said port and having an injector passage therein opening to said valve chamber when the valve is seated, a cap on the upper end of said stem having a restricted bleed port for said passage, and a Venturi tube opening to said brine chamber and operatively associated with said injector passage in said valve.

2. A brine injector valve assembly for water softeners comprising a combined valve and brine chamber having a communicating port, said valve chamber having a water connection and said brine chamber a brine connection, a flexible element in the upper end of said valve chamber, the portion of said valve chamber above said element having a bleed or relief connection, a valve stem carried by and arranged through said element and having a passage opening at its upper end to said bleed connection and at its lower end to said valve chamber, a cylindrical screen carried by said stem and surrounding the entrance to said passage, an upwardly seating valve on said stem controlling said port and having an injector passage therein opening to said valve chamber when the valve is seated, and a Venturi tube opening to said brine chamber and operatively associated with said injector passage in said valve.

3. A brine injector valve assembly for water softeners comprising a combined valve and brine chamber having a communicating port, said valve chamber having a water connection and said brine chamber a brine connection, a flexible element in the upper end of said valve chamber, the portion of said valve chamber above said element having a bleed or relief connection, a valve stem carried by and arranged through said element and having a passage opening at its upper end to said bleed connection and at its lower end to said valve chamber, an upwardly seating valve on said stem controlling said port and having an injector passage therein opening to said valve chamber when the valve is seated, and a Venturi tube opening to said brine chamber and operatively associated with said injector passage in said valve.

4. A valve assembly for water softeners comprising a water inlet chamber and injector chamber connected by a port having a valve seat facing the injector chamber, the injector chamber having a brine inlet connection, a metallic bellows interiorly communicating with said valve chamber, said bellows being closed except for its communicating connection to said inlet chamber, a valve stem arranged through said bellows and supported thereby, said stem having a passage extending from the outer end thereof to a point within the inlet chamber, a bleed valve for restricting the flow through the said passage, a screen carried by said stem for straining the water before it enters said passage, a valve on said stem coacting with said connecting port for said water inlet and injector chamber, said valve having an injector passage therein opening to said inlet chamber when the valve is seated, and a Venturi tube opening to said injector chamber and operatively associated with said injector passage in said valve.

5. A valve assembly for water softeners comprising a water inlet chamber and injector chamber connected by a port having a valve seat facing the injector chamber, the injector chamber having a brine inlet connection, a metallic bellows interiorly communicating with said valve chamber, said bellows being closed except for its communicating connection to said inlet chamber, a valve stem arranged through said bellows and supported thereby, said stem having a passage extending from the outer end thereof to a point within the inlet chamber, a valve on said stem coacting with said connecting port for said water inlet and injector chamber, said valve having an injector passage therein opening to said inlet chamber when the valve is seated, and a Venturi-tube opening to said injector chamber and operatively associated with said injector passage in said valve.

HERBERT S. HUMPHREY.